Reissued Apr. 9, 1935

Re. 19,528

UNITED STATES PATENT OFFICE 19,528

MANUFACTURE OF PAPER

Harold Robert Rafton, Andover, Mass., assignor to Raffold Process Corporation, a corporation of Massachusetts No Drawing. Original No. 1,834,903, dated December 1, 1931, Serial No. 426,189, February 5, 1930. Application for reissue November 29, 1933, Serial No. 700,359

20 Claims. (Cl. 92—21)

This invention relates to the manufacture of paper and more particularly to paper containing alkaline filler.

The principal object of this invention is to provide a novel method of using starch in paper made with alkaline filler.

An important object is to provide a method of using starch which will measurably avoid decomposition of the starch in the papermaking process.

A further object is to provide a method of using starch wherein the maximum viscous properties of the starch are retained.

Other objects and advantages of this invention will become apparent during the course of the following description.

Starch has been used for many years as a constituent of paper mixes to impart stiffening, a firmer feel, and the like qualities to paper made therewith; and where in the claims I use the expression "desirable starch-imparted characteristics" I refer to qualities such as those just mentioned.

As I have disclosed in my copending application Serial No. 202,453, filed June 29, 1927, now Patent No. 1,831,928, issued November 17, 1931, starch is also particularly valuable in certain cases where alkaline fillers are used in papermaking, for substantially eliminating the foam-forming tendency from otherwise foam-forming mixes. In the above referred to application the use of starch in conjunction with alum is also recommended.

Where starch has been employed heretofore as a constituent of paper mixes it has been the customary practice to mix it in a compounding and/or treating device, such as a beater or the like, with an aqueous suspension of fibrous material and such other material as may be employed in papermaking such as filler, size, for example rosin size, size precipitant, for example alum, tinting and the like. This mix usually has a dry solid content of approximately 5%, more or less. The mix after subjection to sufficient treatment in the beater, is then ordinarily discharged into a container commonly called a "beater chest", additional water usually being added. Thereafter the mix may be transferred from the beater chest to a suitable refining engine, usually a Jordan, at a dry solid content which may be approximately in the neighborhood of 4%. In common practice the mix is at this point usually diluted somewhat by the addition of water, and the diluted mix after jordaning is ordinarily conducted from the Jordan to another container commonly known as a "machine chest". From the machine chest the mix is transferred to a point near the web forming end of a paper machine where it is largely diluted with water, this point commonly being referred to as the mixing box, water being here added ordinarily in such an amount as to provide a dry content from approximately ½ to 1% or slightly higher, but usually not in excess of 1½%. The mix in such highly dilute condition is then passed through rifflers or the like if desired and thereafter through screens and through the headbox of the paper machine on to the machine wire, or into a vat, depending upon whether a Fourdrinier or a cylinder machine is employed; and during this passage additional amounts of water are usually added in the form a spray or otherwise.

This exact procedure is not always followed but in some instances is modified in accordance with the type of paper being made. For example, in the manufacture of certain types of paper the beating process is almost if not entirely dispensed with, the ingredients being merely mixed together prior to jordaning. In some instances the step of refining or jordaning may be partially if not wholly dispensed with. Moreover in some cases the arrangement of steps is different; for example, the jordaning may take place subsequent to the machine chest, the stock passing directly from the Jordan to the mixing box. Sometimes also the arrangement of the chests or the number of the chests used is varied. In general, however, it can be stated that in the papermaking process, regardless of the variations which may occur, the ingredients are normally mixed and/or treated in a relatively concentrated condition, and maintained therein for a substantial length of time, and then the mix is subsequently diluted preparatory to delivery to a web-forming device and it remains in this dilute condition only a relatively brief period of time.

Under the conditions above outlined which have been customary when starch has been previously used in paper mixes, certain disadvantages have inhered in its use. For example starch is a putrescible material. It is subject to attack by molds and the like, and in the course of its passage through the beater, chests, and Jordan, up to the point of dilution, the length of time is such that the starch remains sufficiently long in the system for these deteriorating agencies to act thereon to a considerable extent. The deterioration seems to be particularly pronounced in certain instances where the system is alkaline as would be the case where alkaline filler is employed, particularly where it is added in the beater. The putrescent condition is aggravated if there be present in the mix other putrescible materials such as old paper stock (reworked old papers), particularly if such contain reworked coated papers containing casein. If in addition there be other elements which prolong the continuance of contact of the starch with the other ingredients of the mix such as is customary in modern papermaking equipment, this tendency toward decomposition is much more manifest. An example of such elements which maintain the other ingredients of the mix in contact with the starch for longer times is where recovery systems are used in the white water cycle. Sedimentation systems are common for use on the excess white water, and in such instances the recovered stock, which in this case would contain starch, is returned to the papermaking operation, commonly to the beater. Another type of recovery system commonly used and which illustrates the point satisfactorily is the filtration type which normally mixes the excess white water from the machine with the so-called "sweetener" stock usually taken from the beater or machine chest, and returns the material filtered from the excess white water together with the sweetener stock back into one or the other chests. This filtration cycle, as is apparent, returns part of the starch which would ordinarily escape with the white waters back into the papermaking operation and thus prolongs the contact of the starch with the other constituents of the mix and promotes its decomposition.

As a result of the decomposition, not only is the starch in part deteriorated or destroyed, but there is a considerable opinion that such decomposition of the starch is very injurious in promoting slime in the paper and also as being in certain cases an agency which promotes the formation of soft lumps on the paper machine, which in turn greatly interfere with production and reduce the quality of the paper made under such conditions.

Another disadvantage inherent in the method heretofore employed in using starch is the fact that even though the system were kept entirely sterile so that no growth of molds or micro-organisms could take place, nevertheless the constant agitation such as is present for example in the papermaking operation as discussed above, has a tendency to reduce the viscous quality of the starch, which is considered to be an important quality of starch for papermaking use. It will be apparent therefore that the intimate contact of the starch with the other ingredients of the mix, brought about by the agitation it receives in the papermaking apparatus, reduces the value of the starch as a papermaking material, and this lessening of the advantageous qualities of the starch is more or less proportional to the amount of agitation it receives.

I have discovered that the disadvantages inherent in the method of utilizing starch hitherto employed, can be overcome to a very great extent by minimizing the time and/or intimacy of contact of the starch with the other constituents of the paper mix and I have devised a method whereby my discovery can be practically utilized in the papermaking operation.

Briefly, I add the starch to the mix at a point late in the paper making process, for example, subsequent to the passage of the mix through the machine chest and preferably at the wet end of the paper machine, whereby the time of contact of the starch with the other constituents of the mix is greatly minimized. Moreover the addition of the starch in the dilute stage of the papermaking process acts to decrease greatly the intimacy of contact of the constituents of the mix and thereby prevents deterioration of the viscous quality of the starch by diminishing the frictional action to which the starch is subjected.

Of course, in certain cases such as where the refining engine is placed between the final stock chest and the paper machine, the starch may be added subsequent to the delivery of the stock from this final chest. In this case the Jordan acts as an efficient incorporating means for the starch with the paper mix, and inasmuch as the time of contact in the concentrated condition is only very brief, the results are in certain cases wholly satisfactory. However, in most cases I have found it preferable to effect the mixing of the starch at the wet end of the paper machine, usually at the mixing box or at any point which may be convenient prior to the delivery of the mix onto the web-forming device.

It will thus be apparent that my method of utilizing starch in the papermaking process avoids to a great extent the deteriorating influences formerly inherent in the method of adding starch in the beater, removes the starch as a source of putresence from the earlier part of the papermaking operation, tends to prevent in certain cases in a considerable measure the formation of slime and lumps in the papermaking process, and prevents the deterioration of the valuable viscous quality of the starch owing to the prevention of prolonged agitation of the starch in contact with the other constituents of the mix.

As will be apparent this makes for the more efficient use of the starch and lesser amounts than formerly were required to give certain desired properties to the paper mix or resulting paper can now be used. It is thus apparent that my process is very beneficial from the standpoint of starch economy.

In those cases as indicated above where settling or filtration cycles on the excess white waters return the material recovered from the excess white water to the earlier stage in the process either in the beaters as is sometimes done with settling systems or to the chests as is sometimes done with filtration systems it will be apparent that part of the starch in the furnish will be returned to an earlier stage of the process. This, as has been indicated above, is not theoretically the most advantageous procedure. However, owing to the fact that the starch originally introduced is highly viscous owing to its undeteriorated condition, as well as to the fact that a lesser amount of starch may be employed than formerly, less of the starch than was formerly the case will tend to be present in the white water coming from the machine and thus only a relatively small quantity will be reintroduced at an earlier stage in the process. As this quantity is small compared with the original amount of starch employed, and especially if it be reintroduced, as is preferable, in the latter part of the system such as in the machine chest, no serious detriment will be incurred from the presence of this minor quantity of starch in the system prior to the passage of the mix from the machine chest. However, if it be feasible, it is especially advantageous in this connection to employ the machine cycle disclosed in my copending application Serial No. 438,644, filed March 24, 1930, now Patent No. 1,892,471, issued December 27, 1932, whereby substantially all of recovered material is returned to the papermaking operation just prior to or at the dilute stage.

My invention may be conveniently employed in the manufacture either of sized or substantially unsized papers. Moreover, it may be carried out satisfactorily in connection with the processes disclosed in various of my copending applications, that is, the starch may be the only material added at the wet end of the paper machine, or one or more of the following materials may also be added at this point: alkaline filler, alum, size, precipitated sizing, sodium silicate, precipitated silicate, or the like.

A suitable furnish for use in carrying out my invention is as follows:

*Substantially unsized paper*

| | Pounds |
|---|---|
| Sulphite pulp | 350 |
| Soda pulp | 435 |
| Reworked old magazine papers (deinked) | 600 |
| Broke (defective paper to be reworked) | 180 |
| Alkaline filler (e. g. $CaCO_3Mg(OH)_2$) | 720 |
| Alum | 50 |
| Starch | 75 |

In the above furnish the starch is added, preferably continuously, at the wet end of the paper machine. The filler and/or alum may either be added in the beater with the fibrous constituents, or at the wet end of the paper machine.

Another suitable furnish is as follows:

*Sized paper*

| | Pounds |
|---|---|
| Sulphite and soda pulps | 1700 |
| Size (e. g. rosin size) | 45 |
| Alkaline filler (e. g. $CaCO_3Mg(OH)_2$) | 300 |
| Size precipitant (e. g. alum) | 70 |
| Starch | 50 |

In the above furnish starch is added, preferably continuously, at the wet end of the paper machine. Preferably at least part of the alum should also be added at that point. The filler and/or the size may either be added in the beater, or at the wet end of the paper machine.

In both the above furnishes the weights of the size and alkaline filler refer to the bone dry basis; the weights of all other constituents refer to the air dry basis.

It will be understood of course that the above furnishes are intended as illustrative only and in no sense as restrictive, as widely differing furnishes give satisfactory results. The starch used may vary widely in amount. Practically speaking, however, although I do not restrict myself thereto, less than one percent. has but little effect on the finished paper and starch is seldom used in lesser amount in papermaking.

As is well known, starch is customarily employed in the papermaking process by treating raw starch in such a manner as to produce a viscous solution. This may be suitably accomplished by heating starch and water to the point where the starch is cooked, i. e., where it becomes a substantially homogeneous viscous colloidal solution. This solution is then usually allowed to cool. It is in such condition that I preferably employ starch in my process. However, starch, i. e., unmodified starch, is not always employed in papermaking; sometimes the so-called "modified" starches are used. A great variety of these with different properties are on the market, e. g., some are directly soluble in cold water, others give thin boiling solutions. My process, as will be apparent, is also useful with modified starches for although the question of maintaining the viscosity may not be of such great importance with such starches, nevertheless the question of minimizing the putrescence is of considerable importance, and of course my process makes such minimizing feasible.

By the term "alkaline filler" I mean substantially water insoluble filler which when agitated in contact with freshly boiled distilled water, say for an hour, will impart a pH value to such water greater than 7.0, that is, which will be on the alkaline side of the neutral point. Among fillers included in this group may be mentioned calcium carbonate, of which lime mud from the causticizing process is one form; calcium carbonate magnesium basic carbonate employed in the paper disclosed in my U. S. Patent No. 1,595,416, dated August 10, 1926; calcium carbonate magnesium hydroxide disclosed in my U. S. Patent No. 1,415,391, dated May 9, 1922; and other substantially water insoluble normal or basic carbonates of alkaline earth metals, (which expression is herein intended to include magnesium), or compounds, double salts, or physically associated mixtures of these with one or more other acid soluble materials of a substantially water insoluble nature.

By the term "alkaline filler" I also intend to include fibrous material and/or other material such as paper coating constituents or the like containing one or more compounds of the character referred to, such as "old papers" or similar papers, "broke", or the like.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

By the term "wet end of the paper machine", I intend to include those instrumentalities employed in paper manufacture by which and/or in which a relatively concentrated paper mix is diluted, and treated, conveyed or fed up to the point of web-formation, such as the mixing box, regulating and proportioning devices, riffles, troughs, screens, head boxes, inlets, and the like, including also instrumentalities used in the white water cycle.

In my copending application Serial No. 304,167, filed September 5, 1928, now Patent No. 1,803,642, issued May 5, 1931, I have disclosed but not claimed the addition of starch to a fibrous mix at the wet end of the paper machine in the manufacture of paper filled with an alkaline filler.

In my copending application Serial No. 304,175, filed September 5, 1928, now Patent No. 1,803,650, issued May 5, 1931, I have disclosed and claimed a method for sizing paper filled with an alkaline filler in which size such as rosin size and size precipitant such as alum are mixed in the presence of starch, and the resulting product is added to the fibrous mix at the wet end of the paper machine. Moreover, in my copending application Serial No. 319,721, filed November 15, 1928, now Patent No. 1,808,069, issued June 2, 1931, I have disclosed and claimed a method of incorporating into paper filled with alkaline filler an inorganic alkali metal salt with a pH value greater than 7.0, for example sodium silicate which is precipitable by material which depresses its hydroxyl ion concentration, by mixing said alkali metal salt with a precipitant therefor in the presence of starch, and adding the resulting product to the fibrous mix at the wet end of the paper machine. I therefore exclude from the scope of the present specification and claims the addition of starch, in the manufacture of paper filled with alkaline filler, to a fibrous mix under conditions favoring the minimizing of the time and/or intimacy of contact of the constituents of the mix in the cases where such starch has had previously added to it a size or an alkali metal salt such as described in this paragraph, together with a precipitant therefor.

While I have described in detail the preferred embodiment of my invention, it is to be understood that the details of procedure, the proportions of ingredients, and the arrangement of steps may be widely varied without departing from the spirit of my invention or the scope of the subjoined claims.

I claim:

1. The method of manufacturing paper filled with alkaline filler, comprising mixing fibrous material and alkaline filler in the beater, and adding to the resulting mix starch at the wet end of the paper machine.

2. In a method of manufacturing paper filled with alkaline filler the steps of introducing alkaline filler into the fibrous mix, and of adding starch to the fibrous mix under conditions favoring the minimizing of the time of contact of the starch with the constituents of the mix.

3. In a method of manufacturing paper filled with alkaline filler the steps of introducing alkaline filler into the fibrous mix, and of adding starch to the fibrous mix under conditions favoring the minimizing of the time and intimacy of contact of the starch with the constituents of the mix.

4. In a method of manufacturing paper filled with alkaline filler the steps of introducing alkaline filler into the fibrous mix, and of adding starch to the fibrous mix subsequent to the passage of the mix from the machine chest.

5. In a method of manufacturing paper filled with alkaline filler the steps of introducing alkaline filler into the fibrous mix, and of adding starch to the fibrous mix at the wet end of the paper machine.

6. In a method of manufacturing paper filled with alkaline filler the steps of introducing alkaline filler into the fibrous mix, and of adding starch and alum to the fibrous mix under conditions favoring the minimizing of the time of contact thereof with the constituents of the mix.

7. In a method of manufacturing paper filled with alkaline filler the improvement which comprises adding starch, alum, and alkaline filler to a fibrous mix under conditions favoring the minimizing of the time of contact thereof with the constituents of the mix, and thereafter making paper therefrom.

8. In a method of manufacturing paper filled with alkaline filler the improvement which comprises adding starch, alum, alkaline filler, and size to the fibrous mix under conditions favoring the minimizing of the time of contact thereof with the constituents of the mix, and thereafter making paper therefrom.

9. In a method of manufacturing paper filled with alkaline filler the steps of introducing into the fibrous mix alkaline filler comprising calcium carbonate, and of adding starch to the fibrous mix under conditions favoring the minimizing of the time of contact of the starch with the constituents of the mix.

10. In a method of manufacturing paper filled with alkaline filler the steps of introducing into the fibrous mix alkaline filler comprising calcium carbonate and magnesium compound, and of adding starch to the fibrous mix under conditions favoring the minimizing of the time of contact of the starch with the constituents of the mix.

11. In a method of manufacturing paper filled with alkaline filler the steps of introducing into the fibrous mix alkaline filler comprising calcium carbonate magnesium hydroxide, and of adding starch to the fibrous mix under conditions favoring the minimizing of the time of contact of the starch with the constituents of the mix.

12. In a method of manufacturing paper filled with alkaline filler the steps of introducing into the fibrous mix alkaline filler comprising calcium carbonate magnesium hydroxide, and of adding starch to the fibrous mix under conditions favoring the minimizing of the time and intimacy of contact of the starch with the constituents of the mix.

13. In a method of manufacturing paper filled with alkaline filler the steps of introducing into the fibrous mix alkaline filler comprising calcium carbonate magnesium hydroxide, and of adding starch to the fibrous mix at the wet end of the paper machine.

14. In a method of manufacturing paper filled with alkaline filler the steps of adding alkaline filler to a fibrous mix containing old paper stock, and of adding starch to the fibrous mix at the wet end of the paper machine.

15. In a method of manufacturing paper filled with alkaline filler the steps of adding alkaline filler to a fibrous mix containing casein bearing constituent, and of adding starch to the fibrous mix at the wet end of the paper machine.

16. The method of minimizing the putrescence of starch in the manufacture of paper filled with alkaline filler comprising adding alkaline filler to the fibrous mix, and withholding the addition of the starch until late in the process of stock preparation.

17. Paper filled with alkaline filler, said paper comprising fibrous material and alkaline filler, said paper having distributed substantially completely therethrough mix-incorporated starch introduced into the mix subsequent to the beater.

18. Paper filled with alkaline filler, said paper comprising fibrous material and alkaline filler, said paper having distributed substantially completely therethrough mix-incorporated starch substantially undeteriorated by the alkaline filler.

19. Paper filled with alkaline filler, said paper comprising fibrous material, alkaline filler, and aluminum compound resulting from the introduction of alum into the mix subsequent to the beater, said paper having distributed substantially completely therethrough mix-incorporated starch substantially undeteriorated by the alkaline filler.

20. Paper filled with alkaline filler, said paper comprising fibrous material, calcium carbonate, and aluminum compound resulting from the introduction of alum into the mix subsequent to the beater, said paper having distributed substantially completely therethrough mix-incorporated starch substantially undeteriorated by the alkaline filler.

HAROLD ROBERT RAFTON.